US012000650B2

(12) United States Patent
Lee

(10) Patent No.: US 12,000,650 B2
(45) Date of Patent: Jun. 4, 2024

(54) REED SWITCH ASSEMBLY AND REFRIGERATOR

(71) Applicant: LG ELECTRONICS INC., Seoul (KR)

(72) Inventor: Mikyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 234 days.

(21) Appl. No.: 17/557,608

(22) Filed: Dec. 21, 2021

(65) Prior Publication Data

US 2022/0196321 A1 Jun. 23, 2022

(30) Foreign Application Priority Data

Dec. 22, 2020 (KR) ........................ 10-2020-0181104

(51) Int. Cl.
*H01H 36/00* (2006.01)
*F25D 29/00* (2006.01)
*H01H 3/16* (2006.01)

(52) U.S. Cl.
CPC ........... *F25D 29/005* (2013.01); *H01H 3/161* (2013.01); *H01H 36/0033* (2013.01); *H01H 36/0073* (2013.01); *F25D 2700/02* (2013.01)

(58) Field of Classification Search
CPC ......... H01H 3/161; H01H 36/00–36/02; F25D 2700/02
See application file for complete search history.

(56) References Cited

FOREIGN PATENT DOCUMENTS

| | | |
|---|---|---|
| JP | 2006-164958 | 6/2006 |
| JP | 2009-032549 | 2/2009 |
| KR | 20-1999-0015153 | 5/1999 |
| KR | 10-2016-0073818 | 6/2016 |
| KR | 10-1879652 | 8/2018 |
| KR | 10-2076776 | 2/2020 |

OTHER PUBLICATIONS

Korean Office Action dated Sep. 5, 2022 issued in Application No. 10-2020-0181104.

*Primary Examiner* — Ramon M Barrera
(74) *Attorney, Agent, or Firm* — KED & ASSOCIATES, LLP

(57) ABSTRACT

A reed switch assembly includes a case having a receiving space formed therein, a substrate assembly seated on the case, and a cover for covering at least a portion of the substrate assembly, wherein the substrate assembly includes a printed circuit board, and a connector and a reed sensor that are electrically coupled to the printed circuit board.

20 Claims, 9 Drawing Sheets

REED SWITCH ASSEMBLY AND REFRIGERATOR

CROSS-REFERENCE TO RELATED APPLICATION

This application claims priority under 35 U.S.C. § 119 to Korean Application No. 10-2020-0181104 filed on Dec. 22, 2020, whose entire disclosure is hereby incorporated by reference.

BACKGROUND

1. Field

The present disclosure relates to a reed switch assembly and a refrigerator.

2. Background

A refrigerator includes a reed switch for detecting whether a refrigerator door is open or not. For example, when opening of the refrigerator door is detected by the reed switch, control of the refrigerator is performed to turn on a lighting of a storage space of the refrigerator and to turn off a cooling fan to prevent leakage of cold air to the outside of the storage space. Generally, the reed switch is installed in an inner case of the storage space of the refrigerator or is installed in front of a partition for defining a plurality of storage spaces.

Korean Patent Publication No. 10-2016-0073818 as a cited reference discloses a refrigerator including a reed switch assembly. In the case of the cited reference, the refrigerator includes a reed switch for detecting whether a refrigerator door is open or not, but a reed sensor accommodated on a case is directly connected to a terminal connected to a reed wire via pressing, and thus there is a problem in that the reed sensor itself is damaged when strong tensile force is applied to the reed wire.

In particular, since the reed sensor is formed of glass, the reed sensor is vulnerable to external shocks, and a number of damage problem as above occur, and for example, a reed wire is pulled in a process of assembling the reed switch in the refrigerator. Assembling the reed switch in the refrigerator is only possible manually due to a problem such as a tangled reed wire, resulting in a problem of poor productivity.

BRIEF DESCRIPTION OF THE DRAWINGS

The embodiments will be described in detail with reference to the following drawings in which like reference numerals refer to like elements wherein.

DETAILED DESCRIPTION

Figure 1:
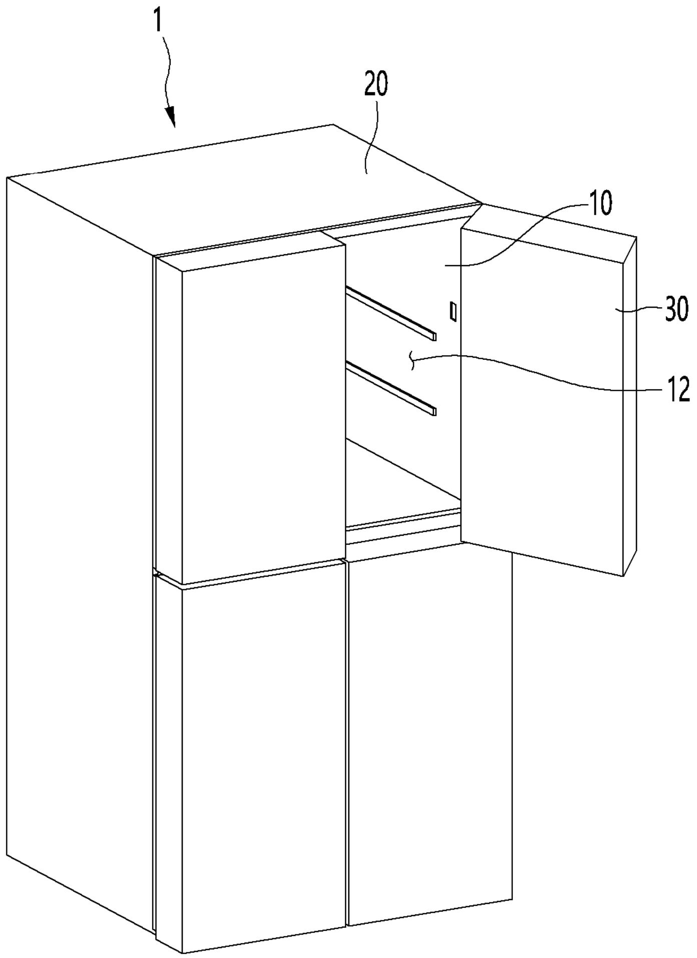
FIG. 1 is a diagram showing the state in which a refrigerator door is open according to an embodiment.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is “connected”, “coupled” or “joined” to another component, the former may be directly connected or jointed to the latter or may be “connected”, coupled” or “joined” to the latter with a third component interposed therebetween.

Figure 2:
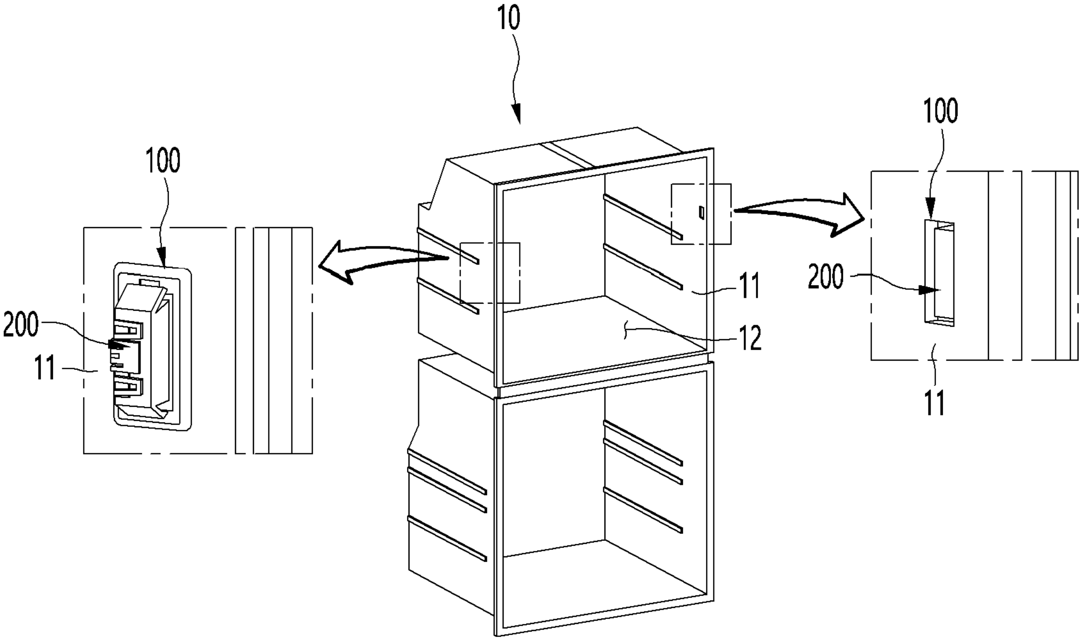
FIG. 2 is a diagram showing the state in which a reed switch assembly is installed in a refrigerator according to an embodiment.
Figure 3:
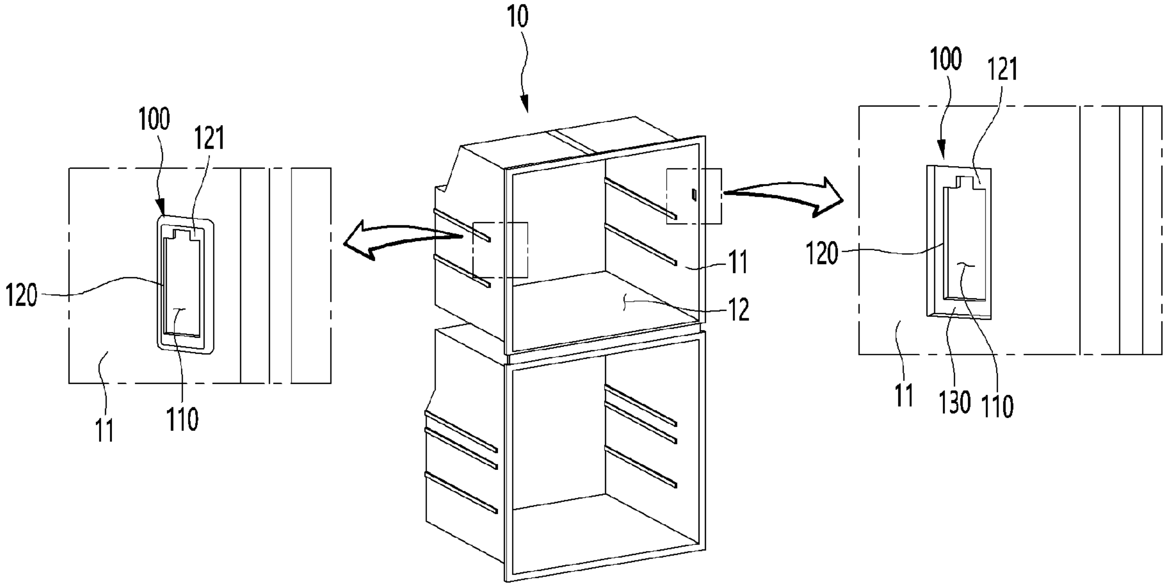
FIG. 3 is a diagram showing the state in which a reed switch assembly is separated from a refrigerator according to an embodiment.

FIG. 1 is a diagram showing the state in which a refrigerator door is open according to an embodiment. FIG. 2 is a diagram showing the state in which a reed switch assembly is installed in a refrigerator according to an embodiment. FIG. 3 is a diagram showing the state in which a reed switch assembly is separated from a refrigerator according to an embodiment.

Referring to FIGS. 1 to 3, a refrigerator 1 according to the embodiment may include an outer case 20 forming an outer appearance, an inner case 10 forming a storage space 12, and a door 30 for opening and closing the storage space 12. For example, the inner case 10 may include sidewalls 11 forming a side surface of the storage space 12. The sidewall 11 may include a reed switch assembly 200 according to the embodiment. A pair of reed switch assemblies 200 may be provided in the sidewalls 11, respectively, and the reed switch assembly 200 may be installed in the sidewall 11 by being partially inserted thereinto.

The sidewall 11 may include an installation part (or installation frame) 100 for installing the reed switch assembly 200 thereon. The installation part 100 may include an insert part 120 for inserting the reed switch assembly 200 thereinto. The installation part 100 may include a protrusion 130 that protrudes from the inside to the outside of the inner case 10. The insert part 120 may be formed based on a protrusion shape of the protrusion 130. According to another aspect, as a portion of the sidewall 11 of the inner case 10 is depressed to the outside, the insert part 120 may be formed. The insert part 120 may be referred to as a recessed space. An opening 110 for the reed switch assembly 200 to pass through may be formed in the protrusion 130.

The insert part 120 may have a rectangular shape and may include a hook coupler 121 on one side. For example, the hook coupler 121 may be positioned above the opening 110. In addition, the protrusion 130 may also be described as including the hook coupler 121. The hook coupler 121 may be hook-coupled to the reed switch assembly 200 by inserting a side hook 214 (refer to FIG. 5) to be described below of the reed switch assembly 200.

When the reed switch assembly 200 is installed on the installation part 100, the reed switch assembly 200 may be coupled to the installation part 100 in such a way that a cover 250 of the reed switch assembly 200 to be described below faces a rear surface of the refrigerator. The reed switch assembly 200 may be inserted and coupled from the inside to the outside of the inner case 10, and in this case, the cover 250 of the reed switch assembly 200 may be positioned in such a way that the cover 250 faces a rear surface of the inner case 10. That is, based on FIG. 2, the reed switch assembly 200 coupled to a left side surface may be inserted toward the sidewall 11 of the inner case 10 from a right side that is the inside of the inner case 10, and the reed switch assembly 200 coupled to a right side surface may be inserted toward the sidewall 11 of the inner case 10 from a left side that is the inside of the inner case 10.

Figure 4:
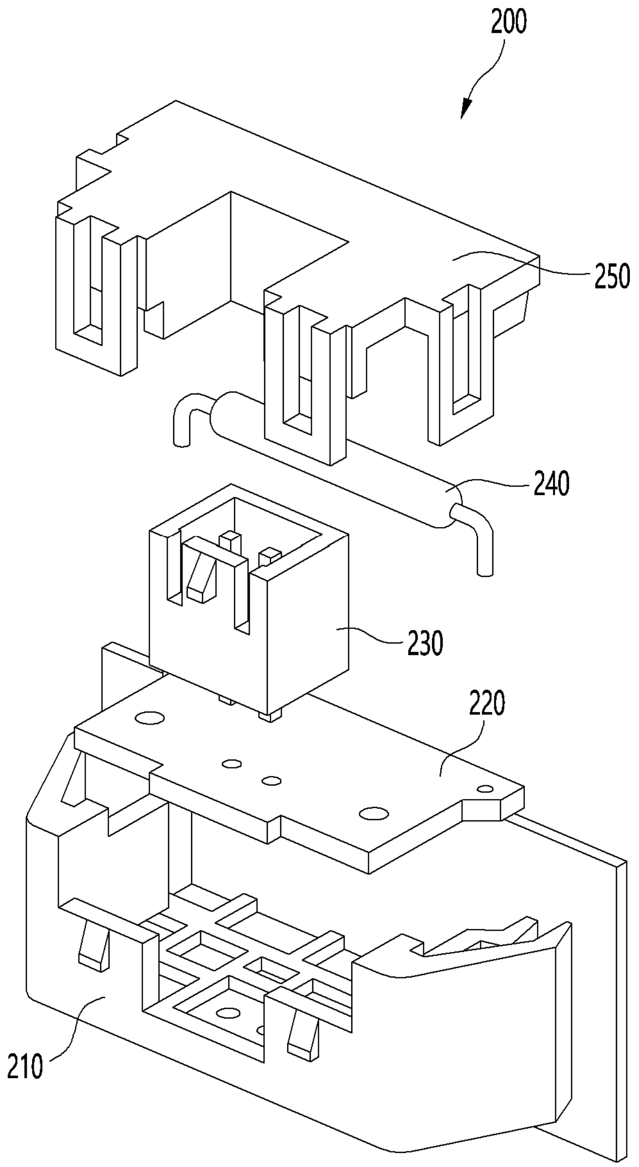
FIG. 4 is an exploded perspective view of a reed switch assembly according to an embodiment.

FIG. 4 is an exploded perspective view of a reed switch assembly according to an embodiment. Referring to FIG. 4, the reed switch assembly 200 may include a case 210 forming an outer appearance, a substrate assembly seated on the case 210, and the cover 250 coupled to the case 210 and covering at least a portion of the substrate assembly.

The case 210, the substrate assembly, and the cover 250 may be sequentially stacked. The substrate assembly may include a printed circuit board 220, and a connector (or port) 230 and a reed sensor 240 that are connected to the printed circuit board 220.

The printed circuit board 220, and the connector 230 and the reed sensor 240 may be electrically coupled to each other, and the cover 250 may cover the reed sensor 240. In other words, the connector 230 may not be covered by the cover 250 and may be exposed to the outside, and the reed sensor 240 may be covered by the cover 250 and may not be exposed to the outside. The cover 250 may face a space between the inner case and the outer case in the state in which the case 210 is inserted into the inner case.

Figure 5:
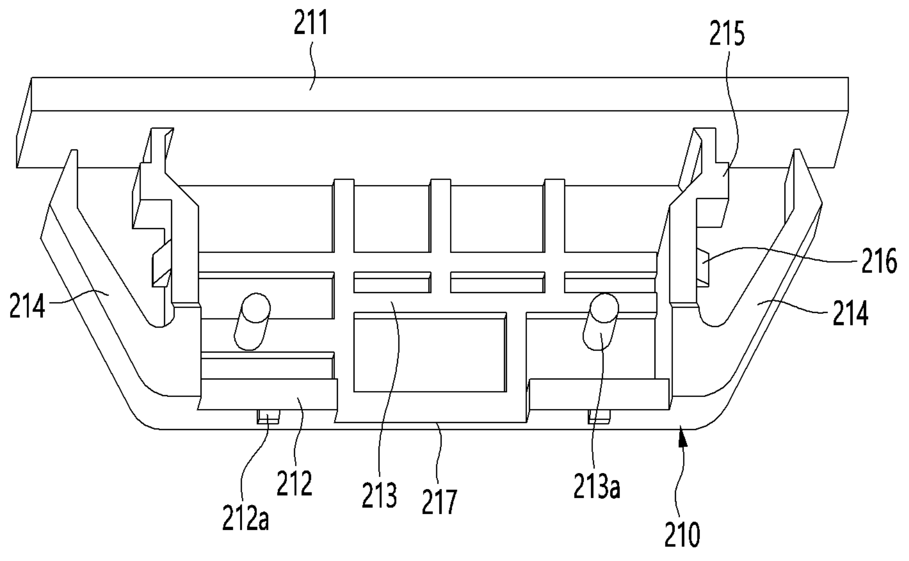
FIG. 5 is a plan view of a case according to an embodiment.

Hereinafter, each component will be described in detail. FIG. 5 is a plan view of a case according to an embodiment. Referring to FIG. 5, the case 210 may include a plate 211 forming a portion of the sidewall 11 of the inner case 10 when the reed switch assembly 200 is inserted into and coupled to the sidewall 11 of the inner case 10, a front surface 212 spaced apart from the plate 211, and a seating part (or seating ledge) 213 on which the substrate assembly is seated between the plate 211 and the front surface 212.

The plate 211 and the front surface 212 may extend in a direction to intersect with the seating part 213. The front surface 212 may include a recess 217 that is partially recessed, and a portion of the printed circuit board 220 may be seated on the recess 217.

The front surface 212 may include a front hook **212*a* that protrudes forward and is hook-coupled to the cover 250. The front surface 212 may include a pair of front hooks 212*a* that are spaced apart from each other on opposite sides based on the recess 217**.

The seating part 213 may protrude vertically from the plate 211 and may correspond to a shape of the printed circuit board 220. A width of a side of the seating part 213, which is in contact with the front surface 212, may be smaller than a width of a side of the seating part 213, which is in contact with the plate 211.

The seating part 213 may include a pair of protrusions **213*a* that protrude to fixed and coupled to the printed circuit board 220. The pair of protrusions 213*a* may be disposed closer to the front surface 212 than the plate 211** and may be spaced apart from each other on opposite sides.

A substrate body 221 of the printed circuit board 220 and a second protrusion 223 of the printed circuit board 220, to be described below, may be seated on the seating part 213, and a first protrusion 222 of the printed circuit board 220, to be described below, may be seated on the recess 217. A portion of the connector 230 may be seated on the recess 217 and may protrude to the outside of the case 210, and power connectors 232 and 233 (refer to FIG. 6) at an upper side of the connector 230 may be exposed to the outside and may be easily connected.

The seating part 213 may include a plurality of ribs. Due to the plurality of ribs, interference with a welded part of a bottom surface of the printed circuit board 220 may be prevented. For example, the plurality of ribs of the seating part 213 may be in direct contact with the printed circuit board 220, and a welded part of a bottom surface of the printed circuit board 220 may be positioned at a portion in which the plurality of ribs are not positioned.

The case 210 may include a pair of side hooks 214 for coupling with the sidewall 11 of the inner case. The side hook 214 may protrude from one side of the front surface 212 and the seating part 213 to extend toward the plate 211 and may have elasticity.

Only one end of the side hook 214 may be coupled to a side surface of the seating part 213, and the other end of the side hook 214 may be freely exposed without a coupled configuration. Thus, when the reed switch assembly 200 is coupled to the sidewall 11 of the inner case, the reed switch assembly 200 may be hook-coupled to the sidewall 11 by the side hook 214.

The case 210 may further include a pair of side protrusions 215 that protrudes on opposite side surfaces of the seating part 213, respectively. The side protrusions 215 may be positioned adjacent to the plate 211 and may guide and fix the cover 250 to be stably coupled to the case 210.

The case 210 may further include a pair of cover hooks 216 provided on opposite side surfaces of the seating part 213 and hook-coupled to the cover 250. The cover hooks 216 may include an inclined surface, and the side hook 214 may be disposed between a portion to which the seating part 213 is coupled and the side protrusion 215.

Figure 6:
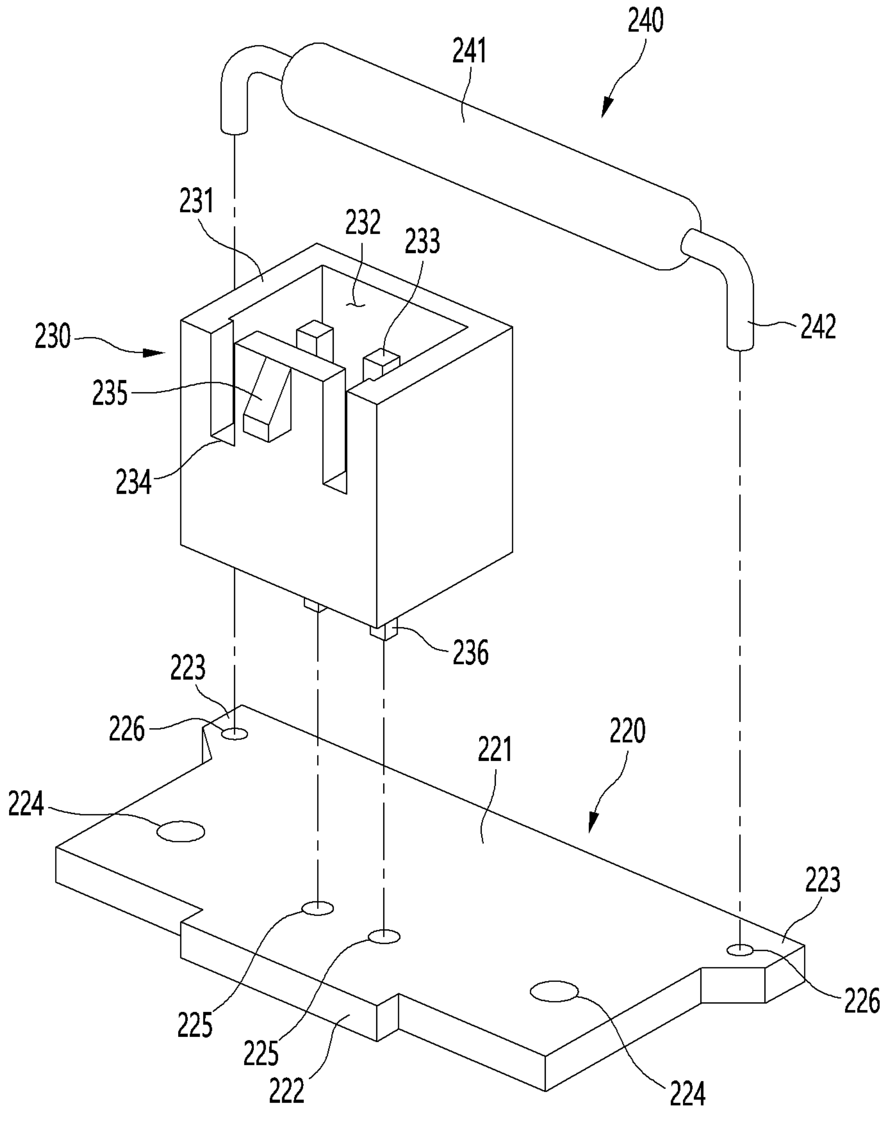
FIG. 6 is an exploded perspective view of a substrate assembly according to an embodiment.
Figure 7:
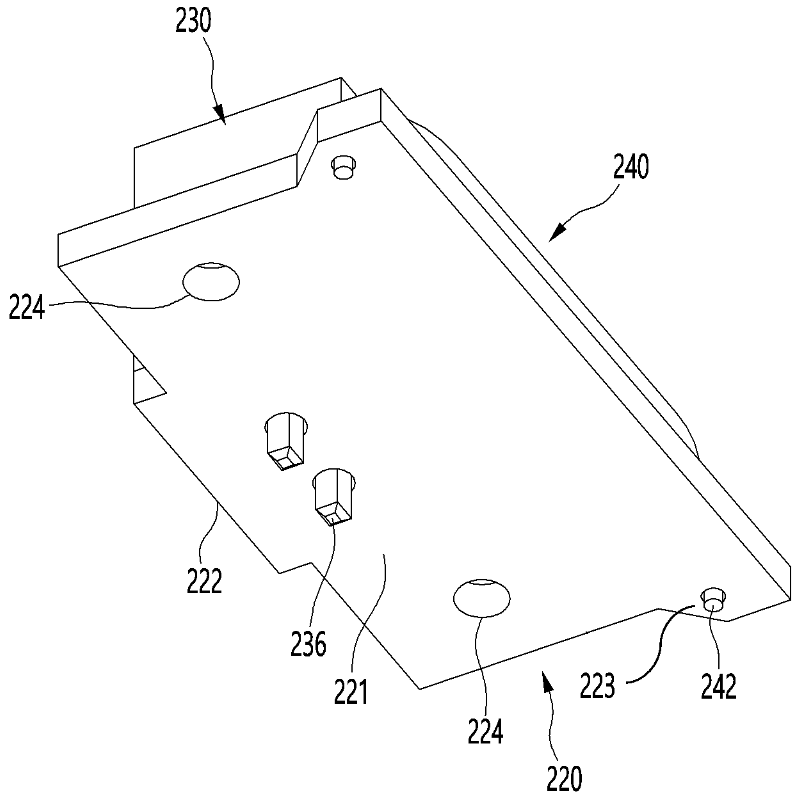
FIG. 7 is a bottom view of a substrate assembly according to an embodiment.
Figure 8:
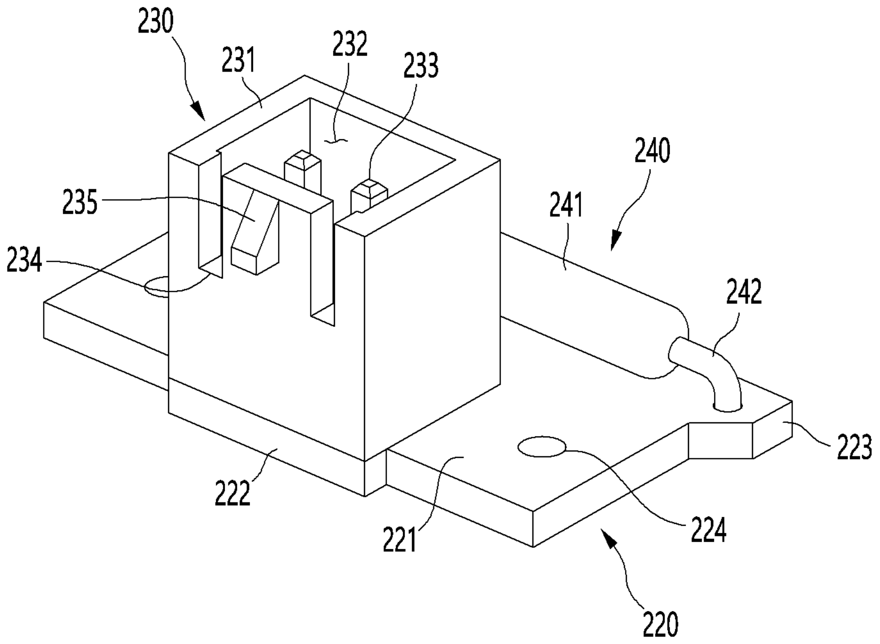
FIG. 8 is a perspective view of a substrate assembly according to an embodiment.

FIG. 6 is an exploded perspective view of a substrate assembly according to an embodiment. FIG. 7 is a bottom view of a substrate assembly according to an embodiment. FIG. 8 is a perspective view of a substrate assembly according to an embodiment.

Referring to FIGS. 6 to 8, a substrate assembly including the connector 230 and the reed sensor 240 that are connected to the printed circuit board 220 will be described in detail. The printed circuit board 220 may be electrically coupled to the connector 230 and the reed sensor 240 before being coupled to the case 210. That is, the connector 230 and the reed sensor 240 may be connected to the printed circuit board 220 via soldering. For example, the printed circuit board 220 may include the substrate body 221, and the substrate body 221 may include a plurality of holes into which at least a portion of the connector 230 and the reed sensor 240 is inserted.

The substrate body 221 may have a rectangular shape and may include the first protrusion 222 protruding from one side and the second protrusion 223 protruding from opposite sides. For example, based on FIG. 6, the first protrusion 222 may protrude forward, and the second protrusions 223 may protrude from opposite sides of a rear side of the substrate body 221.

A portion of the connector 230 may be seated on the first protrusion 222, and a portion of the reed sensor 240 may be seated on the second protrusion 223. A plurality of connector connection holes (or port connection holes) 225 connected to the connector 230 may be formed in the substrate body 221 at a side at which the first protrusion 222 is disposed.

A portion of the connector 230 may be inserted into the connector connection hole 225 to be connected to the printed circuit board 220, and another portion of the connector 230 may be seated on the first protrusion 222. That is, the first protrusion 222 may protrude from the substrate body 221 to seat the portion of the connector 230 thereon when the connector 230 is connected to the connector connection hole 225.

The second protrusion 223 may protrude from opposite sides of the substrate body 221 to correspond to a shape of the reed sensor 240. The second protrusions 223 that protrude from opposite sides may include sensor connection holes 226 for connection with the reed sensor 240, respectively.

Connecting bridges 242 at opposite sides of the reed sensor 240, to be descried below, may be inserted into the sensor connection holes 226 and may electrically connect the reed sensor 240 and the printed circuit board 220 to each other. That is, the printed circuit board 220 may partially protrude to have the minimum volume while seating the connector 230 and the reed sensor 240 that have different shapes.

The printed circuit board 220 may further include fixing holes 224 for coupling the printed circuit board 220 to the case 210 and fixing the location of the case 210. The fixing holes 224 may be arranged at opposite sides of the connector connection holes 225, and the protrusions 213*a* of the case 210 may be inserted into the fixing holes 224.

Unlike the case in which the connector 230 and the reed sensor 240 are electrically coupled to the first and second protrusions 222 and 223, the fixing holes 224 and the case 210 may not be electrically coupled. That is, the fixing holes 224 may simply perform a function of stably coupling and fixing an assembly of the connector 230 and the reed sensor 240 that are coupled to the printed circuit board 220 to the case 210. Thus, the size of the fixing hole 224 may be larger than the size of the connector connection hole 225 and the sensor connection hole 226.

The connector 230 may connect the reed switch assembly 200 to a power connector (not shown) for supplying power after being coupled to the sidewall 11 of the refrigerator inner case. The connector 230 may include a connector body 231, the power connectors 232 and 233 formed at the upper side of the connector body 231, power couplers 234 and 235 formed at a side surface of the connector body 231, and substrate connectors 236 formed at a lower side of the connector body 231.

For example, the power connectors 232 and 233 and the power couplers 234 and 235 may be formed to correspond to the power connectors. The power connectors 232 and 233 may include a power recess (or power connector recess) 232 recessed from the upper side of the connector body 231 and a pair of power protrusions 233 protruding from the power recess 232. The power couplers 234 and 235 may include a power cut part (or power coupling recess) 234 formed by cutting a portion of a side surface of the connector body 231, and a power hook 235 for hook-coupling. The substrate connectors 236 may protrude from a bottom side of the connector body 231 and may be inserted into the connector connection holes 225 to electrically couple the printed circuit board 220 and the connector 230 to each other.

The reed sensor 240 may include a cylindrical sensor body 241 and the connecting bridges 242 to be connected to the printed circuit board 220 at opposite sides of the sensor body 241. The sensor body 241 may extend in a longitudinal direction of the printed circuit board 220, and the connecting bridges 242 may be inserted into the sensor connection holes 226 to electrically couple the reed sensor 240 and the printed circuit board 220.

Figure 9:
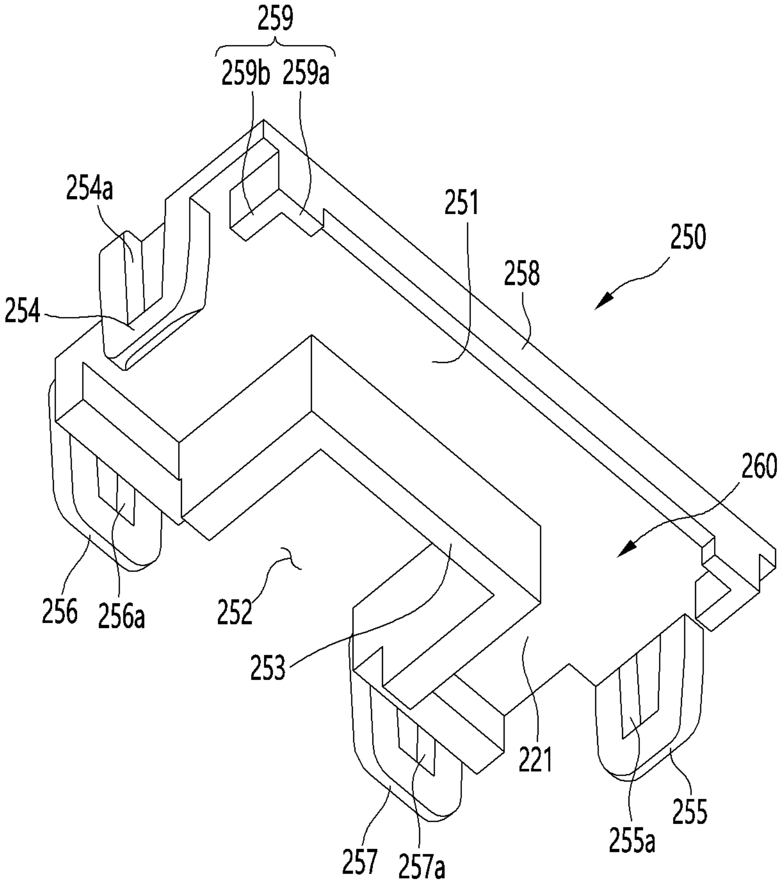
FIG. 9 is a bottom perspective view of a cover according to an embodiment.

FIG. 9 is a bottom perspective view of a cover according to an embodiment. Referring to FIG. 9, the cover 250 may include a cover body 251 for covering a substrate assembly coupled to the case 210.

The cover body 251 may be formed like a plate, and a portion of the cover body 251, at which the connector 230 is positioned, may be recessed. That is, the cover 250 may include an exposure space 252 for exposing the connector 230 to the outside.

The cover 250 may include an exposed part (or exposed wall) 253 in contact with a side surface of the connector 230 outside the exposure space 252. That is, the exposed part 253 may be formed outside the exposure space 252 and may be in contact with three surfaces of the side surfaces of the connector 230.

The cover 250 may include a pair of first couplers 254 and 255 for coupling with the case 210. The pair of first couplers 254 and 255 may protrude downward from opposite ends of the cover body 251 and may include first hook insert parts (or first hook insert recesses) 254*a* and 255*a* into which the cover hooks 216 of the case 210 are inserted.

The cover 250 may further include a pair of second couplers 256 and 257 that protrude and extend downward from a front surface of the cover body 251. Similarly to the first couplers 254 and 255, the second couplers 256 and 257 may also include second hook insert parts (or second hook insert recesses) 256*a* and 257*a* into which the front hook 212*a* formed on the front surface of the case 210 is inserted. That is, the cover 250 may be hook-coupled to the case 210 to be stably coupled thereto through first and second couplers formed on a front surface and opposite surfaces of the cover 250.

The cover 250 may include an extension 258 that extends downward from the cover body 251 to achieve the same level as the case 210 when the cover 250 is coupled to the case 210. That is, the extension 258 may be in contact with the plate 211 and may stably cover the case 210 and the substrate assembly.

The cover 250 may include extension protrusions 259 that protrude from opposite sides of the extension 258, respectively. The extension protrusion 259 may include a first extension protrusion 259*a* that protrudes further downward than the extension 258 and a second extension protrusion 259*b* that is vertically bent from the first extension protrusion 259*a* and extends to the inside of the cover body 251.

For example, when the cover 250 is coupled to the case 210, the extension protrusion 259 may be positioned outside the seating part 213 and may guide and fix the cover 250 to be stably coupled to the case 210 without change in the location of the cover 250. The extension protrusion 259 may be in contact with the side protrusions 215 of the case 210 to be fixed thereto.

Figure 10:
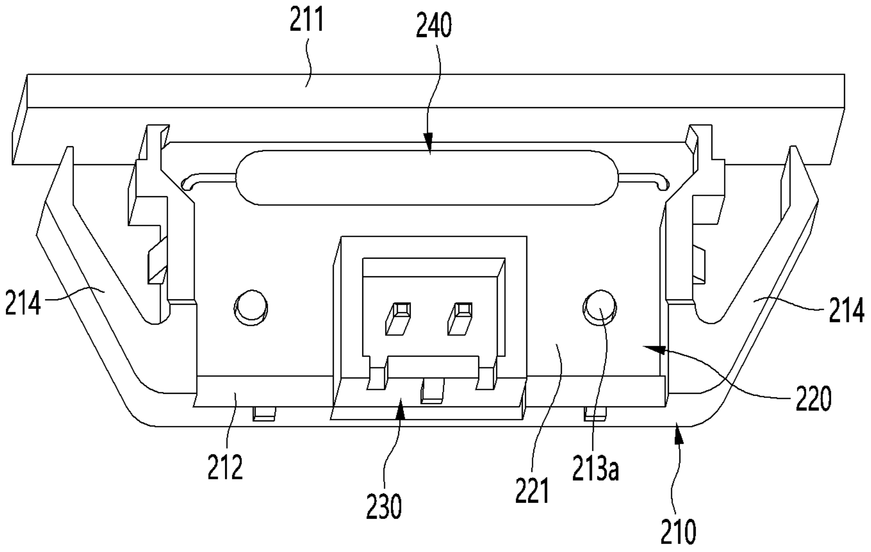
FIG. 10 is a diagram showing the state in which a substrate assembly is coupled to a base according to an embodiment.
Figure 11:
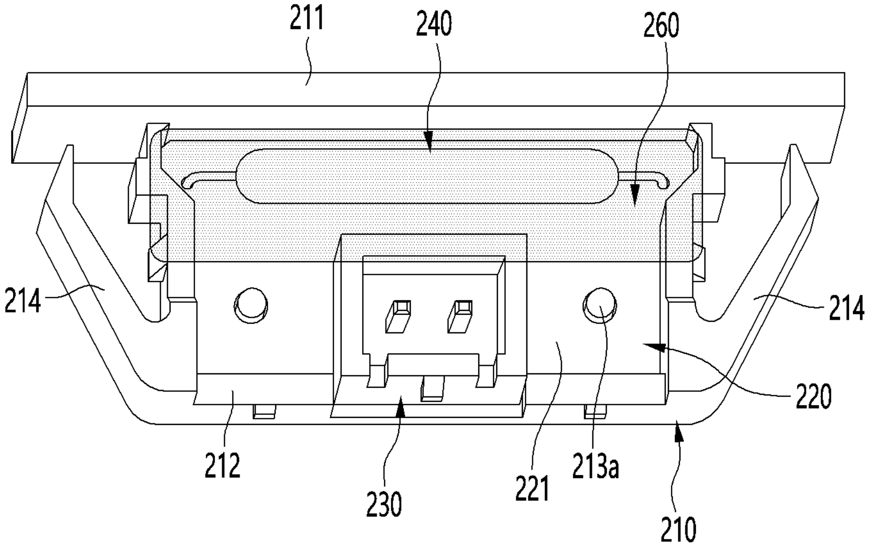
FIG. 11 is a diagram showing the state in which silicon is coated on a reed switch assembly of FIG. 10.
Figure 12:
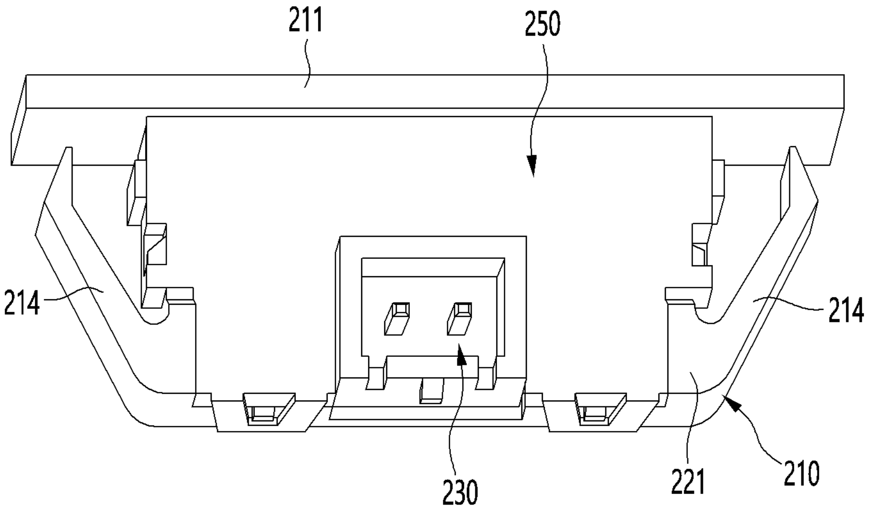
FIG. 12 is a plan view of a reed switch assembly according to an embodiment.
Figure 13:
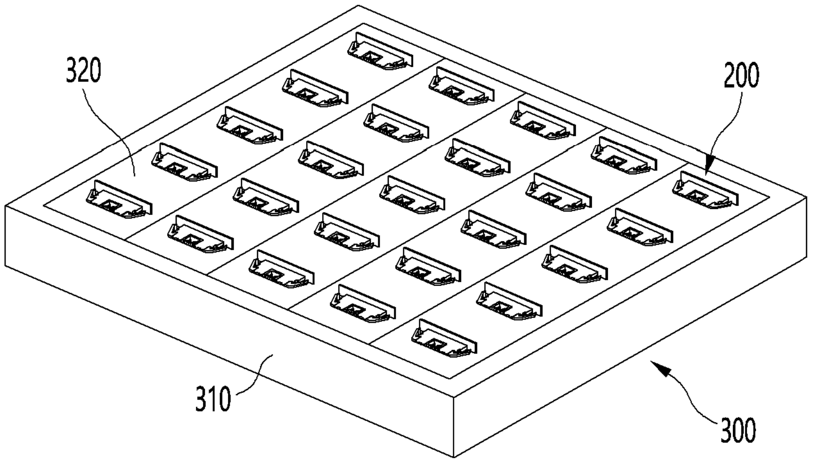
FIG. 13 is a diagram of a reed switch module according to an embodiment.

FIG. 10 is a diagram showing the state in which a substrate assembly is coupled to a base according to an embodiment. FIG. 11 is a diagram showing the state in which silicon is coated on a reed switch assembly of FIG. 10. FIG. 12 is a plan view of a reed switch assembly according to an embodiment. FIG. 13 is a diagram of a reed switch module according to an embodiment.

An assembly procedure of the reed switch assembly 200 will be described in detail with reference to FIGS. 10 to 12. The connector 230 and the reed sensor 240 may be circuit-connected to the printed circuit board 220 to assemble a substrate assembly.

The substrate assembly may be seated on the case 210 as the protrusions 213*a* is inserted into the fixing holes 224. The first protrusion 222 may be seated on the recess 217 of the case 210, and the second protrusion 223 of the printed circuit board 220 may be in contact with the plate 211 of the case 210.

When the substrate assembly is seated on the seating part 213 of the case 210, silicon 260 may be coated on a portion of the printed circuit board 220. The silicon 260 may entirely cover the reed sensor 240, thereby preventing moisture from penetrating into the reed sensor 240 and protecting the reed sensor 240 from external shocks. An external power connector needs to be connected to the connector 230, and thus the silicon 260 may be coated to avoid the connector 230.

After the silicon 260 is coated, the cover 250 may be hook-coupled to the case 210. The cover hooks 216 of the case 210 may be inserted into the pair of first couplers 254 and 255, and the front hook 212*a* of the case 210 may be inserted into and hook-coupled to the pair of second couplers 256 and 257.

When the reed switch assembly 200 is all assembled, the power connectors 232 and 233 of an upper surface of the connector 230 may be exposed to the outside, and when the reed switch assembly 200 is inserted into the sidewall 11 of the inner case, the power connectors 232 and 233 may face a rear surface of the inner case 10. That is, in the state in which the case 210 is coupled to the inner case, the power connectors 232 and 233 may face a space between the inner case and the outer case.

The reed switch assembly 200 according to the embodiment may be assembled to the inner case through an automated process as the configuration of a reed wire is removed. Referring to FIG. 13, a reed switch module 300 may be formed for a robot (not shown) to pick up the reed switch assemblies 200 one by one and to assemble and align the reed switch assemblies 200 in the inner case 10.

The reed switch module 300 may include a rectangular outer case 310 and an alignment part 320 on which the reed switch assemblies 200 are aligned. The robot may pick up the reed switch assemblies 200 one by one from the reed switch module 300 and may assemble the reed switch assemblies 200 to the inner case 10, thereby advantageously improving productivity.

According to the embodiments, the problem in terms of damage to a reed sensor due to a reed wire may be overcome by removing the configuration of the reed wire. It may be possible to perform an automated process by providing the reed switch assembly in a compact structure, thereby improving productivity and quality of a refrigerator through the automated process. In addition, a reed switch may be installed on a sidewall of an inner case not to be exposed to the outside, thereby preventing breakdown and damage of the reed switch and improving an outer appearance of a refrigerator.

Embodiments provide a reed switch assembly and a refrigerator from which the configuration of a reed wire is removed. Embodiments provide a reed switch assembly and a refrigerator for reducing a risk of damage of the reed sensor and improving productivity.

According to an aspect, a reed switch assembly may include a case having a receiving space formed therein, a substrate assembly seated on the case, and a cover for covering at least a portion of the substrate assembly. The substrate assembly may include a printed circuit board, and a connector and a reed sensor that are electrically coupled to the printed circuit board.

The case may include a seating part on which the substrate assembly is seated. The printed circuit board may be seated on the seating part. The seating part may include a protrusion for connection with the substrate assembly, and the printed circuit board may include a fixing hole into which the protrusion is inserted.

The case may further include a plate extending in a direction to intersect with the seating part, and a front surface spaced apart from the plate. A recess may be formed in the front surface, and a protrusion positioned on the recess may be formed on the printed circuit board.

A portion of the connector may be installed on an upper surface of the protrusion, and when the printed circuit board is seated on the seating part, a portion of the connector may be seated on the recess. The printed circuit board may include a connector connection hole connected to the connector, and a sensor connection hole connected to the reed sensor.

The cover and the case may be hook-coupled to each other. The case may include a cover hook that protrudes from a side surface of the seating part on which the substrate assembly is seated, and a front hook that protrudes from the front surface of the seating part.

The cover may include a first coupler into which the cover hook is inserted and a second coupler into which the front hook is inserted. The cover may cover the reed sensor, and the connector may be exposed to an outside.

The cover may include an exposed part that is recessed toward the reed sensor to make the connector be exposed to the outside when being inserted into the case. The connector may include a power connector for receiving power from the outside, and the power connector may be exposed to the outside.

According to another aspect, a refrigerator may include an outer case forming an outer appearance, an inner case positioned inside the outer case and forming a storage space, a door for opening and closing the storage space, and a reed switch assembly for detecting opening and closing of the door.

The reed switch assembly may include a case having a receiving space formed therein and installed in the inner case, a substrate assembly seated on the case, and a cover for covering at least a portion of the substrate assembly. The substrate assembly may include a printed circuit board, and a connector and a reed sensor that are electrically coupled to the printed circuit board. The reed sensor may detect opening and closing of the door.

At least a portion of the case may be inserted into the inner case and the case may include a plate forming a portion of a sidewall of the inner case. The case may face a space between the inner case and the outer case in a state in which the case is inserted into the inner case.

The connector may include a power connector, and the power connector may face a space between the inner case and the outer case in a state in which the case is inserted into the inner case. The cover may include an exposure space for exposing the power connector.

An installation part including an opening into which the reed switch assembly is inserted may be provided in the sidewall of the inner case. The reed switch assembly may include side hooks protruding from opposite side surfaces of the case for being hook-coupled to the installation part.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A reed switch assembly comprising a case having a receiving space formed therein;

a substrate assembly seated in the receiving space of the case; and a cover that is coupled to the case to shield at least a portion of the substrate assembly, wherein the substrate assembly includes a printed circuit board, a port, and a reed sensor, the port and the reed sensor being electrically coupled to the printed circuit board, wherein the case includes a seating ledge, and wherein the printed circuit board is seated on the seating ledge.

2. The reed switch assembly of claim 1, wherein the seating ledge includes a protrusion, and wherein the printed circuit board includes a fixing hole into which the protrusion is inserted.

3. The reed switch assembly of claim 1, wherein the case further includes a plate extending in a direction to intersect the seating ledge, and a front surface spaced apart from the plate, wherein a recess is formed in the front surface of the case, and wherein the printed circuit board includes a protrusion that is positioned in the recess when the printed circuit board is seated on the seating ledge.

4. The reed switch assembly of claim 3, wherein at least a portion of the port is installed on an upper surface of the protrusion, and wherein, when the printed circuit board is seated on the seating ledge, at least a portion of the port is seated on the recess.

5. The reed switch assembly of claim 1, wherein the printed circuit board includes a port connection hole connected to the port, and a sensor connection hole connected to the reed sensor.

6. The reed switch assembly of claim 1, wherein the cover and the case are hook-coupled to each other.

7. The reed switch assembly of claim 6, wherein the case includes a cover hook that protrudes from a side surface of the seating ledge on which the substrate assembly is seated, and a front hook that protrudes from the front surface of the seating ledge.

8. The reed switch assembly of claim 7, wherein the cover includes a first coupler into which the cover hook is inserted and a second coupler into which the front hook is inserted.

9. A refrigerator comprising:
an outer case;
an inner case positioned inside the outer case to define a storage space;
a door to open and close the storage space; and
a reed switch assembly according to claim 1.

10. The refrigerator of claim 9, wherein at least a portion of the case is inserted into an opening of the inner case, and the case includes a plate covering the opening of the inner case.

11. The refrigerator of claim 10, wherein a portion of the cover faces a space between the inner case and the outer case when the case is inserted into the inner case.

12. The refrigerator of claim 10, wherein the port includes a power connector, and
wherein the power connector faces a space between the inner case and the outer case when the case is inserted into the inner case.

13. The refrigerator of claim 12, wherein the cover includes an exposure wall that is positioned to expose the power port when the cover is coupled to the case.

14. The refrigerator of claim 9, further comprising an installation frame provided in a sidewall of the inner case and including an opening into which the reed switch assembly is inserted.

15. The refrigerator of claim 14, wherein the reed switch assembly includes side hooks protruding from opposite side surfaces of the case and configured to be coupled to the installation frame when the reed switch assembly is inserted into the opening of the installation frame.

16. A reed switch assembly comprising,
a case having a receiving space formed therein;
a substrate assembly seated in the receiving space of the case; and
a cover that is coupled to the case to shield at least a portion of the substrate assembly,
wherein the substrate assembly includes:
a printed circuit board,
a port,
a reed sensor, the port and the reed sensor being electrically coupled to the printed circuit board, and
silicon coated on at least a portion of the printed circuit board to cover the reed sensor.

17. A refrigerator comprising
an outer case;
an inner case positioned inside the outer case to define a storage space;
a door to open and close the storage space; and
a reed switch assembly according to claim 16.

18. A reed switch assembly comprising:
a case having a receiving space formed therein;
a substrate assembly seated in the receiving space of the case; and
a cover that is coupled to the case to shield at least a portion of the substrate assembly,
wherein the substrate assembly includes:
a printed circuit board,
a port, and
a reed sensor, the port and the reed sensor being electrically coupled to the printed circuit board,
wherein the cover is configured to shield the reed sensor, and the port is exposed to an outside of the case and the cover, and
wherein the cover includes an exposed wall that is recessed toward the reed sensor such that the exposed wall of the cover is positioned between the reed sensor and the port to allow the port to be exposed to the outside when the cover is coupled to the case.

19. The reed switch assembly of claim 18, wherein the port includes a power connector for receiving power, and
wherein the power connector is exposed to the outside of the case and the cover.

20. A refrigerator comprising
an outer case;
an inner case positioned inside the outer case to define a storage space;
a door to open and close the storage space; and
a reed switch assembly according to claim 18.

* * * * *